(12) United States Patent
DeKam (10) Patent No.: US 10,729,054 B2
(45) Date of Patent: Aug. 4, 2020

(54) TRACKED AGRICULTURAL IMPLEMENT HAVING A CASTER WHEEL ASSEMBLY

(71) Applicant: CNH Industrial America LLC, New Holland, PA (US)

(72) Inventor: Monte Lee DeKam, Westmont, IL (US)

(73) Assignee: CNH Industrial America LLC, New Holland, PA (US)

( * ) Notice: Subject to any disclaimer, the term of this patent is extended or adjusted under 35 U.S.C. 154(b) by 27 days.

(21) Appl. No.: 15/890,982

(22) Filed: Feb. 7, 2018

(65) Prior Publication Data
US 2019/0239414 A1 Aug. 8, 2019

(51) Int. Cl.
| A01B 63/16 | (2006.01) |
| A01B 73/04 | (2006.01) |
| A01B 49/06 | (2006.01) |

(52) U.S. Cl.
CPC ............ *A01B 63/16* (2013.01); *A01B 73/044* (2013.01); *A01B 49/06* (2013.01)

(58) Field of Classification Search
CPC ................................. A01B 63/16; A01B 63/22
See application file for complete search history.

(56) References Cited

U.S. PATENT DOCUMENTS

| 4,119,156 | A | 10/1978 | Wheeler et al. |
| 4,558,882 | A | 12/1985 | Fuss et al. |
| 4,944,355 | A | 7/1990 | Karchewski |
| 6,202,756 | B1 | 3/2001 | Hundeby et al. |
| 6,401,832 | B1 | 6/2002 | Payne et al. |
| 7,740,084 | B2 | 6/2010 | Rosenboom |
| 7,854,273 | B2 | 12/2010 | Friggstad et al. |
| 8,235,133 | B2 | 8/2012 | Frigstad |
| 8,342,258 | B2 | 1/2013 | Ryder et al. |
| 8,733,256 | B2 | 5/2014 | Kinzenbaw |
| 9,681,598 | B2 | 6/2017 | Anderson et al. |
| 9,682,736 | B1 | 6/2017 | Prickel et al. |
| 9,763,376 | B2 | 9/2017 | Balckwell |
| 2006/0191695 | A1 | 8/2006 | Walker et al. |
| 2014/0262378 | A1* | 9/2014 | Connors ............... A01B 69/003 172/387 |
| 2017/0006762 | A1 | 1/2017 | Dienst et al. |

OTHER PUBLICATIONS

"Multi Farming Systems Multiplanter," Farming Ahead, Oct. 1998, pp. 25-27, No. 82.
"Mustang Tool Bar Powered With Exactrix Engine Technology," Broadcast, May 14, 2015, Technical Bulletin 518B, pp. 1-14.

* cited by examiner

*Primary Examiner* — Tara Mayo-Pinnock
(74) *Attorney, Agent, or Firm* — Rebecca L. Henkel; Rickard K. DeMille (57) ABSTRACT

An agricultural implement includes a main frame assembly, a track assembly coupled to the main frame assembly, and a toolbar coupled to the main frame assembly. Furthermore, the agricultural implement includes a caster wheel assembly including a linkage assembly coupled to the toolbar, an actuator, and a caster wheel. The caster wheel is pivotally coupled to the linkage assembly to enable the caster wheel to caster relative to the linkage assembly while the toolbar is in a working position and in a raised position. In addition, the actuator is configured to control a vertical position of the caster wheel relative to the toolbar. The actuator has a first end and a second end, and the second end is positioned between a bottom link and a top link of the linkage assembly.

16 Claims, 5 Drawing Sheets

TRACKED AGRICULTURAL IMPLEMENT HAVING A CASTER WHEEL ASSEMBLY

BACKGROUND

The disclosure relates generally to a tracked agricultural implement having a caster wheel assembly.

Generally, planting implements (e.g., planters) are towed behind a tractor or other work vehicle via a hitch assembly. These planting implements typically include multiple row units distributed across the width of the implement. Each row unit is configured to deposit seeds at a target depth beneath the soil surface, thereby establishing rows of planted seeds. For example, each row unit may include a ground engaging tool or opener (e.g., an opener disc) that forms a seeding path (e.g., trench) for seed deposition into the soil. In certain configurations, a gauge wheel is positioned a vertical distance above the opener to establish a target trench depth for seed deposition into the soil. As the implement travels across a field, the opener excavates a trench into the soil, and seeds are deposited into the trench via a seed tube positioned behind the opener. In certain row units, the opener is followed by a packer wheel that packs the soil on top of the deposited seeds.

Certain planting implements include a main frame assembly non-rotatably coupled to the hitch assembly, and track assemblies (e.g., a pair of track assemblies) coupled to the main frame assembly and configured to support the main frame assembly. Furthermore, a toolbar is coupled to the main frame assembly and configured to support the row units. In certain configurations, the planting implement includes one or more support wheels coupled to the toolbar (e.g., proximate to ends of the toolbar) to support the toolbar at least while the implement is engaged in planting operations. Unfortunately, due to the configuration and/or position of the support wheels, the support wheels may not effectively track the path of the planting implement, thereby smearing the soil surface. As a result, the yield from seeds planted within the path of the support wheels may be reduced.

BRIEF DESCRIPTION

In one embodiment, an agricultural implement includes a main frame assembly and a hitch assembly non-rotatably coupled to the main frame assembly and configured to rotatably couple the agricultural implement to a work vehicle. The agricultural implement also includes a track assembly coupled to the main frame assembly and configured to support the main frame assembly. In addition, the agricultural implement includes a toolbar coupled to the main frame assembly. The toolbar includes a center section, a first wing section, and a second wing section. In addition, the first wing section is configured to rotate relative to the center section, the second wing section is configured to rotate relative to the center section, and the toolbar is configured to support multiple row units. Furthermore, the agricultural implement includes a caster wheel assembly coupled to one wing section of the first and second wing sections. The caster wheel assembly includes a linkage assembly, an actuator, and a caster wheel. In addition, the linkage assembly includes a toolbar link, a caster wheel link, a bottom link, and a top link, the toolbar link is non-rotatably coupled to the one wing section, the bottom link is pivotally coupled to the toolbar link at a first pivot joint, the bottom link is pivotally coupled to the caster wheel link at a second pivot joint, the top link is pivotally coupled to the toolbar link at a third pivot joint, and the top link is pivotally coupled to the caster wheel link at a fourth pivot joint. Furthermore, the actuator is configured to control a vertical position of the caster wheel relative to the one wing section, the actuator has a first end and a second end, and the second end is positioned between the bottom link and the top link. The caster wheel is pivotally coupled to the caster wheel link to enable the caster wheel to caster relative to the caster wheel link while the toolbar is in a working position and in a raised position.

In another embodiment, an agricultural implement includes a main frame assembly and a hitch assembly non-rotatably coupled to the main frame assembly and configured to rotatably couple the agricultural implement to a work vehicle. The agricultural implement also includes a track assembly coupled to the main frame assembly and configured to support the main frame assembly. Furthermore, the agricultural implement includes a toolbar coupled to the main frame assembly. The toolbar is vertically movable relative to the main frame assembly between a working position and a raised position, and the toolbar is configured to support multiple row units. The agricultural implement also includes a caster wheel assembly coupled to the toolbar. The caster wheel assembly includes a linkage assembly, an actuator, and a caster wheel. The linkage assembly includes a toolbar link, a caster wheel link, a bottom link, and a top link. In addition, the toolbar link is non-rotatably coupled to the toolbar, the bottom link is pivotally coupled to the toolbar link at a first pivot joint, the bottom link is pivotally coupled to the caster wheel link at a second pivot joint, the top link is pivotally coupled to the toolbar link at a third pivot joint, and the top link is pivotally coupled to the caster wheel link at a fourth pivot joint. The actuator is configured to control a vertical position of the caster wheel relative to the toolbar, the actuator has a first end and a second end, and the second end is positioned between the bottom link and the top link. Furthermore, the caster wheel is pivotally coupled to the caster wheel link to enable the caster wheel to caster relative to the caster wheel link while the toolbar is in the working position and in the raised position.

In a further embodiment, an agricultural implement includes a main frame assembly and a hitch assembly non-rotatably coupled to the main frame assembly and configured to rotatably couple the agricultural implement to a work vehicle. The agricultural implement also includes a track assembly coupled to the main frame assembly and configured to support the main frame assembly. In addition, the agricultural implement includes a toolbar coupled to the main frame assembly, in which the toolbar is configured to support multiple row units. The agricultural implement also includes a caster wheel assembly coupled to the toolbar. The caster wheel assembly includes a linkage assembly, an actuator, and a caster wheel. In addition, the caster wheel assembly is positioned forward of the toolbar relative to a direction of travel of the agricultural implement such that a rotational axis of the caster wheel is positioned within a longitudinal extent of the track assembly at least while the toolbar is in a working position and in a raised position. Furthermore, the linkage assembly includes a toolbar link, a caster wheel link, a bottom link, and a top link. The toolbar link is non-rotatably coupled to the toolbar, the bottom link is pivotally coupled to the toolbar link at a first pivot joint, the bottom link is pivotally coupled to the caster wheel link at a second pivot joint, the top link is pivotally coupled to the toolbar link at a third pivot joint, and the top link is pivotally coupled to the caster wheel link at a fourth pivot joint. The actuator is configured to control a vertical position of the caster wheel relative to the toolbar. In addition, the actuator has a first end and a second end, and the second end is positioned between the bottom link and the top link. The caster wheel is pivotally coupled to the caster wheel link to enable the caster wheel to caster relative to the caster wheel link while the toolbar is in the working position and in the raised position.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
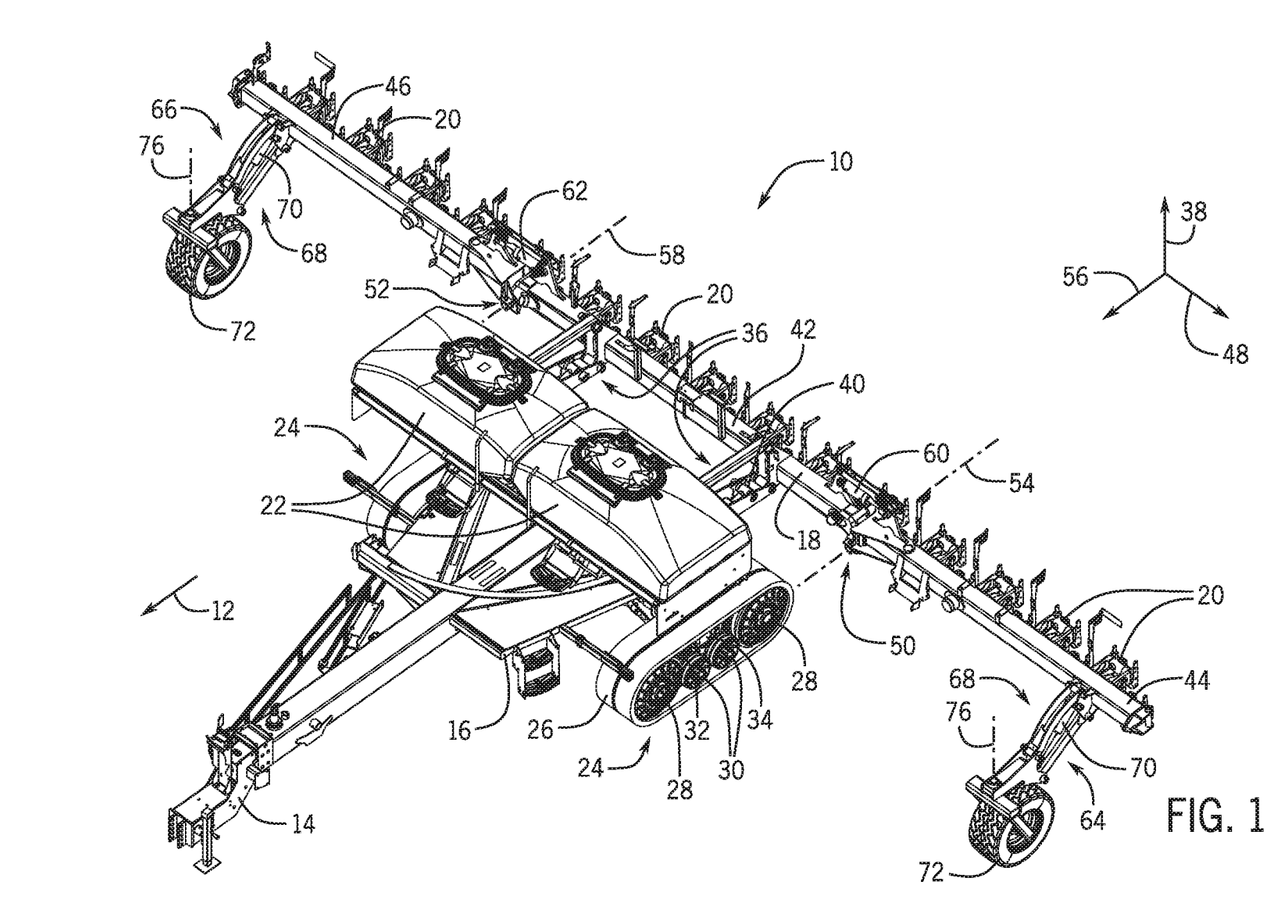
FIG. 1 is a perspective view of an embodiment of an agricultural implement, in which a toolbar of the agricultural implement is in a raised position.

FIG. 1 is a perspective view of an embodiment of an agricultural implement 10 (e.g., a planting implement), in which a toolbar of the agricultural implement is in a raised position. In the illustrated embodiment, the agricultural implement 10 is configured to be towed along a direction of travel 12 by a work vehicle, such as a tractor or other prime mover. The work vehicle may be coupled to the agricultural implement 10 by a hitch assembly 14. As illustrated, the hitch assembly 14 is non-rotatably coupled to a main frame assembly 16 of the agricultural implement 10 to facilitate towing of the agricultural implement 10 in the direction of travel 12. In the illustrated embodiment, the main frame assembly 16 is coupled to a toolbar 18 that includes multiple mounts 20 for supporting multiple row units. Each row unit is configured to deposit seeds at a target depth beneath the soil surface, thereby establishing rows of planted seeds. The agricultural implement 10 also includes seed tanks 22, and a pneumatic distribution system configured to convey seeds from the tanks to the row units. In certain embodiments, the pneumatic distribution system includes an inductor box positioned beneath each seed tank 22. Each inductor box is configured to receive seeds from a respective tank, to fluidize the seeds into an air/seed mixture, and to distribute the air/seed mixture to the row units via a network of pneumatic hoses/conduits. While the illustrated agricultural implement 10 includes two seed tanks 22, in alternative embodiments, the agricultural implement may include more or fewer seed tanks, such as 1, 2, 3, 4, 5, 6, or more seed tanks.

In certain embodiments, each row unit includes a residue manager, an opening assembly, a seed tube, closing discs, and a press wheel. The residue manager includes a rotating wheel having multiple tillage points or fingers that break up crop residue, thereby preparing the soil for seed deposition. The opening assembly includes a gauge wheel and an opener disc. The gauge wheel may be positioned a vertical distance above the opener disc to establish a target trench depth for seed deposition into the soil. As the row unit travels across a field, the opener disc excavates a trench into the soil for seed deposition. The seed tube, which may be positioned behind the opening assembly, directs a seed from a metering system into the excavated trench. The closing discs then direct the excavated soil into the trench to cover the planted seed. Finally, the press wheel packs the soil on top of the seed with a target pressure.

While the illustrated agricultural implement 10 includes 31 row unit mounts 20 for 31 row units, in alternative embodiments, the agricultural implement may include more or fewer row unit mounts for a corresponding number of row units. For example, certain agricultural implements may include 6, 8, 12, 16, 23, 24, 31, 32, or 36 row unit mounts for a corresponding number of row units. In addition, the spacing between row unit mounts/row units may be particularly selected for the type of crop being planting. For example, the row unit mounts/row units may be spaced 30 inches from one another for planting corn, and 15 inches from one another for planting soy beans.

In the illustrated embodiment, the agricultural implement 10 includes two track assemblies 24. Each track assembly 24 is coupled to the main frame assembly 16 and configured to support the main frame assembly 16 above the soil surface. As illustrated, each track assembly 24 includes a track 26, a pair of idler wheels 28, and a pair of roller wheels 30. The pair of idler wheels 28 and the pair of roller wheels 30 are rotatably coupled to a frame 32 of the track assembly 24, and the frame 32 is pivotally coupled to the main frame assembly 16 by a pivot assembly 34. The pivot assembly 34 enables the track assembly 24 to follow the contours of a field as the agricultural implement 10 traverses the field along the direction of travel 12. In addition, the pair of idler wheels 28 and/or the pair of roller wheels 30 includes engagement features configured to engage corresponding engagement features of the track 26, thereby coupling the track 26 to the frame 32 of the track assembly 24. While each track assembly 24 includes two idler wheels 28 and two roller wheels 30 in the illustrated embodiment, in other embodiments, at least one track assembly may include more or fewer idler wheels and/or roller wheels. In addition, while each track assembly 24 includes a single track 26 in the illustrated embodiment, in other embodiments, at least one track assembly may include multiple tracks. Furthermore, while the illustrated agricultural implement 10 includes two track assemblies 24, in other embodiments, the agricultural implement may include more or fewer track assemblies.

In the illustrated embodiment, the toolbar 18 is movably coupled to the main frame assembly 16 by two linkage assemblies 36. The linkage assemblies 36 enable the toolbar 18 to move substantially along a vertical axis 38 between a working position, the illustrated raised position, and a transport position. In the illustrated embodiment, each linkage assembly is a four-bar linkage assembly. However, in other embodiments, at least one linkage assembly may be another suitable type of linkage assembly. As illustrated, actuators (e.g., hydraulic cylinders, etc.) extend between the main frame assembly 16 and one link (e.g., the bottom link) of each respective linkage assembly 36. The actuators are configured to drive the toolbar 18 between the working position, the raised position, and the transport position. While a single actuator 40 is coupled to each linkage assembly 36 in the illustrated embodiment, in other embodiments, more or fewer actuators (e.g., 0, 1, 2, 3, 4, or more) may be coupled to each linkage assembly. For example, in certain embodiments, a single actuator coupled to one linkage assembly may be employed to move the toolbar substantially along the vertical axis. While the illustrated agricultural implement 10 includes two linkage assemblies 36, in other embodiments, the agricultural implement may include more or fewer linkage assemblies (e.g., 1, 2, 3, 4, or more). Furthermore, in certain embodiments, the position of the toolbar may be fixed relative to the main frame assembly. In such embodiments, the vertical position of the toolbar may be controlled by adjusting the position of the main frame assembly relative to the track assemblies (e.g., via one or more actuators extending between the track assemblies and the main frame assembly).

In the illustrated embodiment, the toolbar 18 has a center section 42, a left (e.g., first) wing section 44, and a right (e.g., second) wing section 46. The left and right wing sections are positioned on opposite sides of the center section relative to a lateral axis 48. As illustrated, the left wing section 44 is pivotally coupled to the center section 42 by a first wing joint 50, and the right wing section 46 is pivotally coupled to the center section 42 by a second wing joint 52. The first wing joint 50 is configured to enable the left wing section 44 to rotate relative to the center section 42 about an axis 54 substantially parallel to a longitudinal axis 56. In addition, the second wing joint 52 is configured to enable the right wing section 46 to rotate relative to the center section 42 about an axis 58 substantially parallel to the longitudinal axis 56. In certain embodiments, the first and second wing joints are configured to block rotation of the respective wing sections about an axis parallel to the lateral axis and about an axis parallel to the vertical axis.

In the illustrated embodiment, a first wing actuator 60 is configured to urge the left wing section 44 to rotate downwardly about the axis 54 while the toolbar 18 is in the working position to drive the row units coupled to the left wing section 44 to engage the soil (e.g., to drive the opener of each row unit into the soil). In certain embodiments, the first wing actuator 60 may also be configured to drive the left wing section 44 to rotate upwardly about the axis 54 to a folded position (e.g., as the toolbar 18 transitions to the transport position). Furthermore, a second wing actuator 62 is configured to urge the right wing section 46 to rotate downwardly about the axis 58 while the toolbar 18 is in the working position to drive the row units coupled to the right wing section 46 to engage the soil (e.g., to drive the opener of each row unit into the soil). In certain embodiments, the second wing actuator 62 may also be configured to drive the right wing section 46 to rotate upwardly about the axis 58 to a folded position (e.g., as the toolbar 18 transitions to the transport position).

In the illustrated embodiment, the agricultural implement 10 includes a first caster wheel assembly 64 coupled to the left wing section 44 and a second caster wheel assembly 66 coupled to the right wing section 46. As discussed in detail below, each caster wheel assembly includes a linkage assembly 68, an actuator 70, and a caster wheel 72. Each linkage assembly 68 is configured to enable the respective caster wheel 72 to move substantially along the vertical axis 38 relative to the respective wing section of the toolbar 18. In addition, each actuator 70 is configured to control the vertical position of the respective caster wheel 72 relative to the respective wing section. As discussed in detail below, each caster wheel 72 is pivotally coupled to the respective linkage assembly 68 to enable the caster wheel to caster (e.g., rotate about an axis 76 substantially parallel to the vertical axis 38) relative to the linkage assembly 68 while the toolbar 18 is in the working position and in the raised position.

While a single caster wheel assembly is coupled to each wing section in the illustrated embodiment, in other embodiments, more or fewer caster wheel assemblies (e.g., 0, 1, 2, 3, 4, or more) may be coupled to each wing section. For example, in certain embodiments one caster wheel assembly may be coupled to one wing section, and no caster wheel assembly may be coupled to the other wing section. Furthermore, in certain embodiments, at least one caster wheel assembly may be coupled to the center section of the toolbar. In addition, while the illustrated toolbar includes one left wing section and one right wing section, in other embodiments, the toolbar may include more or fewer wing sections (e.g., 0, 1, 2, 3, 4, or more) on each lateral side of the center section. For example, if two wing sections are positioned on the left side of the center section, a first left wing section may be pivotally coupled to the center section, and a second left wing section may be pivotally coupled to the first left wing section. In embodiments having multiple wing sections on at least one side of the center section, a caster wheel assembly may be coupled to one or more of the wing sections.

With the toolbar 18 in the illustrated raised position, the row units coupled to the toolbar are disengaged from the ground (e.g., to enable the agricultural implement 10 to complete a headland turn). In certain embodiments, while the toolbar 18 is in the illustrated raised position, the caster wheels 72 are positioned such that the wing sections of the toolbar 18 are substantially aligned with the center section 42 (e.g., the toolbar 18 is substantially straight along the lateral axis 48, and the wing sections are not angled substantially upwardly or downwardly relative to the center section). To lower the toolbar 18 to the working position, the actuators 40 are retracted, thereby lowering the toolbar 18 substantially along the vertical axis 38 relative to the main frame assembly 16. In addition, the actuators 70 of the caster wheel assemblies are retracted, thereby raising the caster wheels 72 upwardly substantially along the vertical axis 38 relative to the respective wing sections of the toolbar 18. In certain embodiments, while the toolbar 18 is in the working position, the caster wheels 72 are positioned such that the wing sections of the toolbar 18 are substantially aligned with the center section 42 (e.g., the toolbar 18 is substantially straight along the lateral axis 48, and the wing sections are not angled substantially upwardly or downwardly relative to the center section). With the toolbar 18 in the working position, the row units engage the soil surface with sufficient force to facilitate planting operations. Furthermore, the toolbar 18 may be raised to the transport position by extending the actuators 40 to move the toolbar 18 above the illustrated raised position. In addition, the first wing actuator 60 and the second wing actuator 62 may retract to rotate the respective wing sections upwardly, such that the caster wheels 72 disengage the soil. With the toolbar in the transport position, the implement may be moved between fields and/or to a storage location.

As previously discussed, each caster wheel 72 is pivotally coupled to the respective linkage assembly 68 to enable the caster wheel to caster (e.g., rotate about the axis 76 substantially parallel to the vertical axis 38) relative to the linkage assembly 68 while the toolbar 18 is in the illustrated raised position. Because each caster wheel 72 is configured to caster while the toolbar is in the illustrated raised position, the caster wheel 72 may be oriented tangentially to the path of the caster wheel through a turn, thereby substantially reducing or eliminating smearing of the soil by the caster wheel. As a result, the quality of the soil positioned under the caster wheel may be enhanced, thereby increasing the yield from seeds planted within the path of the caster wheel and/or reducing the intensity and/or frequency of tilling operations.

Figure 2:
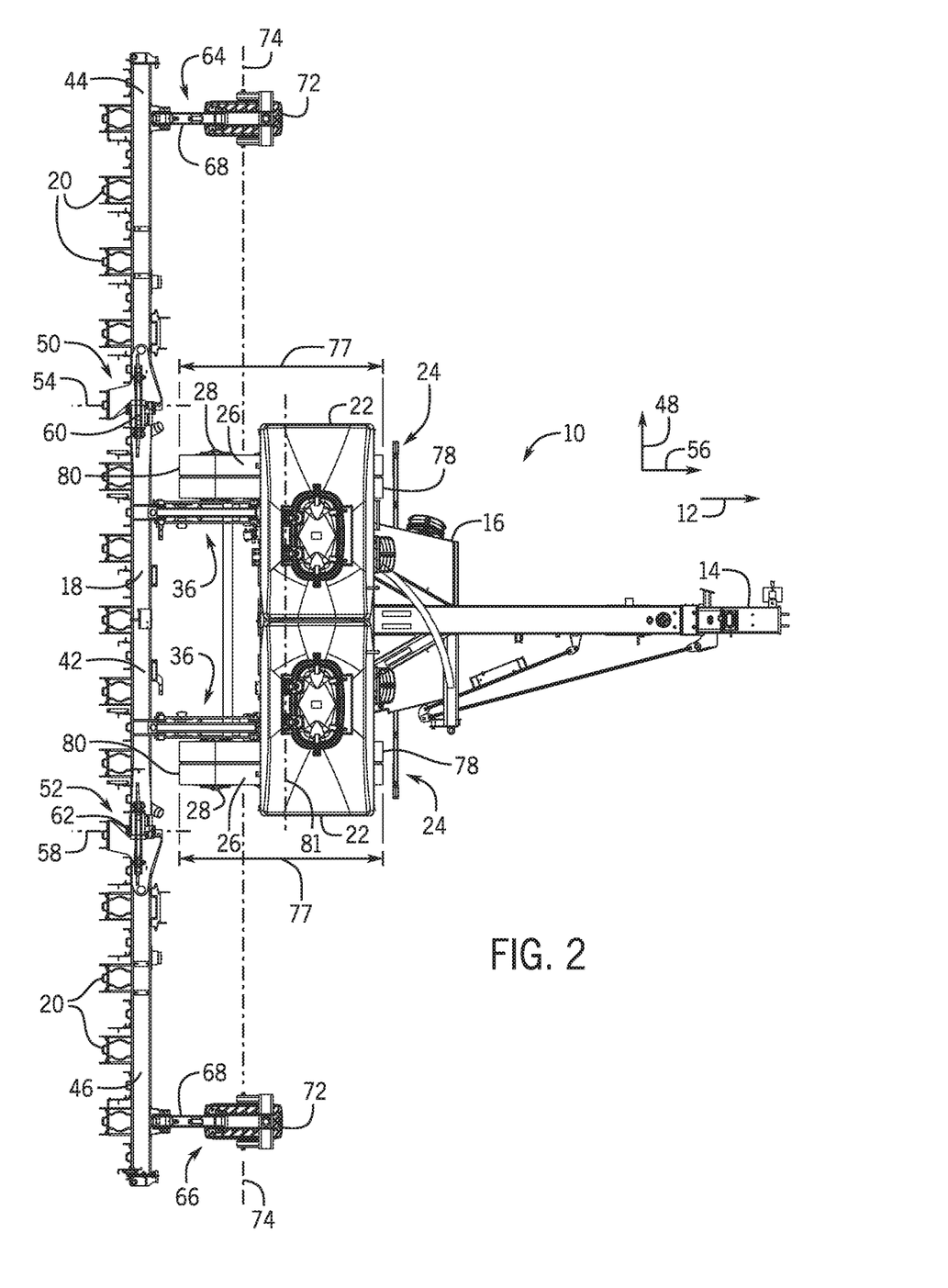
FIG. 2 is a top view of the agricultural implement of FIG. 1, in which the toolbar is in the raised position.

FIG. 2 is a top view of the agricultural implement 10 of FIG. 1, in which the toolbar 18 is in the raised position. In the illustrated embodiment, each caster wheel assembly is positioned forward of the toolbar 18 relative to the direction of travel 12. As illustrated, while the toolbar 18 is in the raised position, each linkage assembly 68 is configured to position a rotational axis 74 of each respective caster wheel 72 within a longitudinal extent 77 of the track assemblies 24 (e.g., within the longitudinal extent 77 of a respective track assembly 24) while the caster wheels 72 are aligned with the longitudinal axis 56. Accordingly, the rotational axis 74 of the caster wheel 72 of the first caster wheel assembly 64 (e.g., while the caster wheel 72 is aligned with the longitudinal axis 56, as illustrated) is positioned between a front end 78 and a rear end 80 of the left track assembly, and the rotational axis 74 of the caster wheel 72 of the second caster wheel assembly 66 (e.g., while the caster wheel 72 is aligned with the longitudinal axis 56, as illustrated) is positioned between a front end 78 and a rear end 80 of the right track assembly. Indeed, the rotational axes 74 of the caster wheels 72 are positioned forward of the rotational axes of the rear idler wheels 28 of the track assemblies in the illustrated embodiment. In addition, the rotational axis 74 of each caster wheel 72 is positioned rearward of a longitudinal center point 81 of the track assemblies 24 (e.g., rearward of a longitudinal center point 81 of a respective track assembly 24) relative to the direction of travel 12. Because the rotational axes 74 of the caster wheels 72 are positioned within the longitudinal extent 77 of the track assemblies while the caster wheels 72 are aligned with the longitudinal axis 56, the caster wheels 72 are oriented at or near a tangent to the swept path of the caster wheels as the agricultural implement turns. Accordingly, the caster angle of each caster wheel during a turn may be reduced (e.g., as compared to a wheel positioned behind the track assemblies), which may reduce smearing of the soil surface within the path of the caster wheel (e.g., if the caster wheel experiences resistance to castering).

While the rotational axis 74 of each caster wheel 72 (e.g., while the caster wheel 72 is aligned with the longitudinal axis 56, as illustrated) is positioned rearward of the longitudinal center point 81 of the track assemblies 24 (e.g., rearward of the longitudinal center point 81 of a respective track assembly 24) in the illustrated embodiment, in other embodiments, the rotational axis of at least one caster wheel may be positioned forward of the longitudinal center point of the track assemblies/respective track assembly while the toolbar is in the raised position. Furthermore, while the rotational axis 74 of each caster wheel 72 (e.g., while the caster wheel 72 is aligned with the longitudinal axis 56, as illustrated) is positioned within the longitudinal extent 77 of the track assemblies 24 (e.g., within the longitudinal extent 77 of a respective track assembly 24) in the illustrated embodiment, in other embodiments, the rotational axis of at least one caster wheel may be positioned forward or rearward of the longitudinal extent of the track assemblies/respective track assembly while the toolbar is in the raised position. In addition, while each caster wheel is positioned forward of the toolbar 18 relative to the direction of travel 12 in the illustrated embodiment, in other embodiments, at least one caster wheel may be positioned rearward of the toolbar relative to the direction of travel, and/or at least one caster wheel may be positioned substantially even with the toolbar along the longitudinal axis (e.g., below the toolbar, laterally outward from the toolbar, etc.) while the toolbar is in the raised position.

Figure 3:
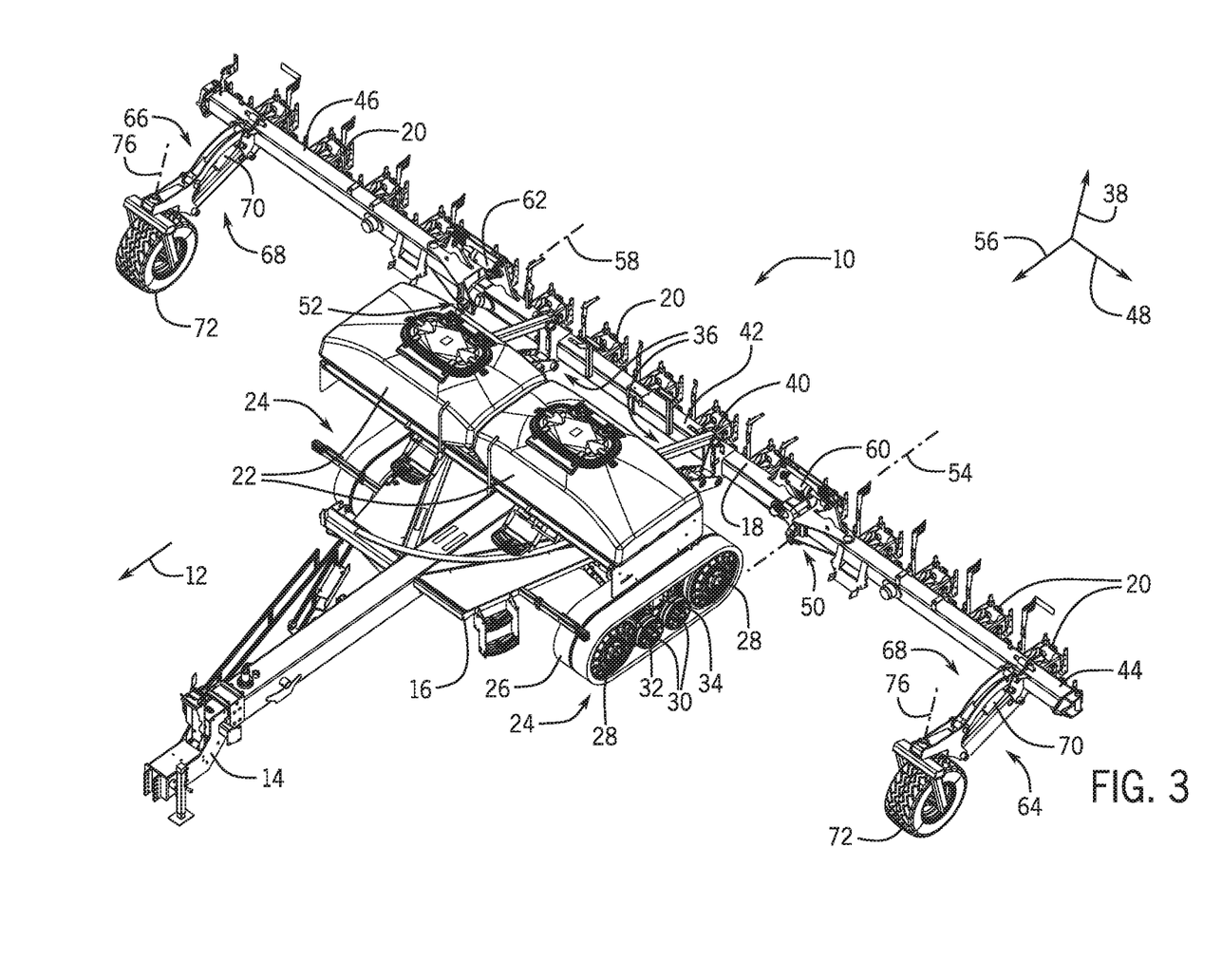
FIG. 3 is a perspective view of the agricultural implement of FIG. 1, in which the toolbar is in a working position.

FIG. 3 is a perspective view of the agricultural implement 10 of FIG. 1, in which the toolbar 18 is in a working position. As previously discussed, with the toolbar 18 in the working position, the row units coupled to the toolbar 18 engage the soil surface with sufficient force to facilitate planting operations. For example, with the toolbar 18 in the working position, a gauge wheel of each row unit may engage the soil surface, thereby positioning each respective opener a target depth below the soil surface. As the agricultural implement travels across the field, each opener excavates a respective trench into the soil at the target depth, and seeds are deposited into each trench via a seed tube positioned behind the opener. Furthermore, as the toolbar 18 moves substantially long the vertical axis 38 from the raised positioned to the illustrated working position, the cylinders 70 of the caster wheel assemblies retract, thereby raising the caster wheels 72 relative to the toolbar 18. For example, while the toolbar 18 is in the working position, the caster wheels 72 may be positioned such that the wing sections of the toolbar 18 are substantially aligned with the center section 42 (e.g., the toolbar 18 is substantially straight along the lateral axis 48, and the wing sections are not angled substantially upwardly or downwardly relative to the center section). Furthermore, because each caster wheel 72 is configured to caster while the toolbar is in the illustrated working position, the caster wheel 72 may be oriented tangentially to the path of the caster wheel through a turn, thereby substantially reducing or eliminating smearing of the soil by the caster wheel. As a result, the quality of the soil positioned under the caster wheel may be enhanced, thereby increasing the yield from seeds planted within the path of the caster wheel and/or reducing the intensity and/or frequency of tilling operations.

Figure 4:
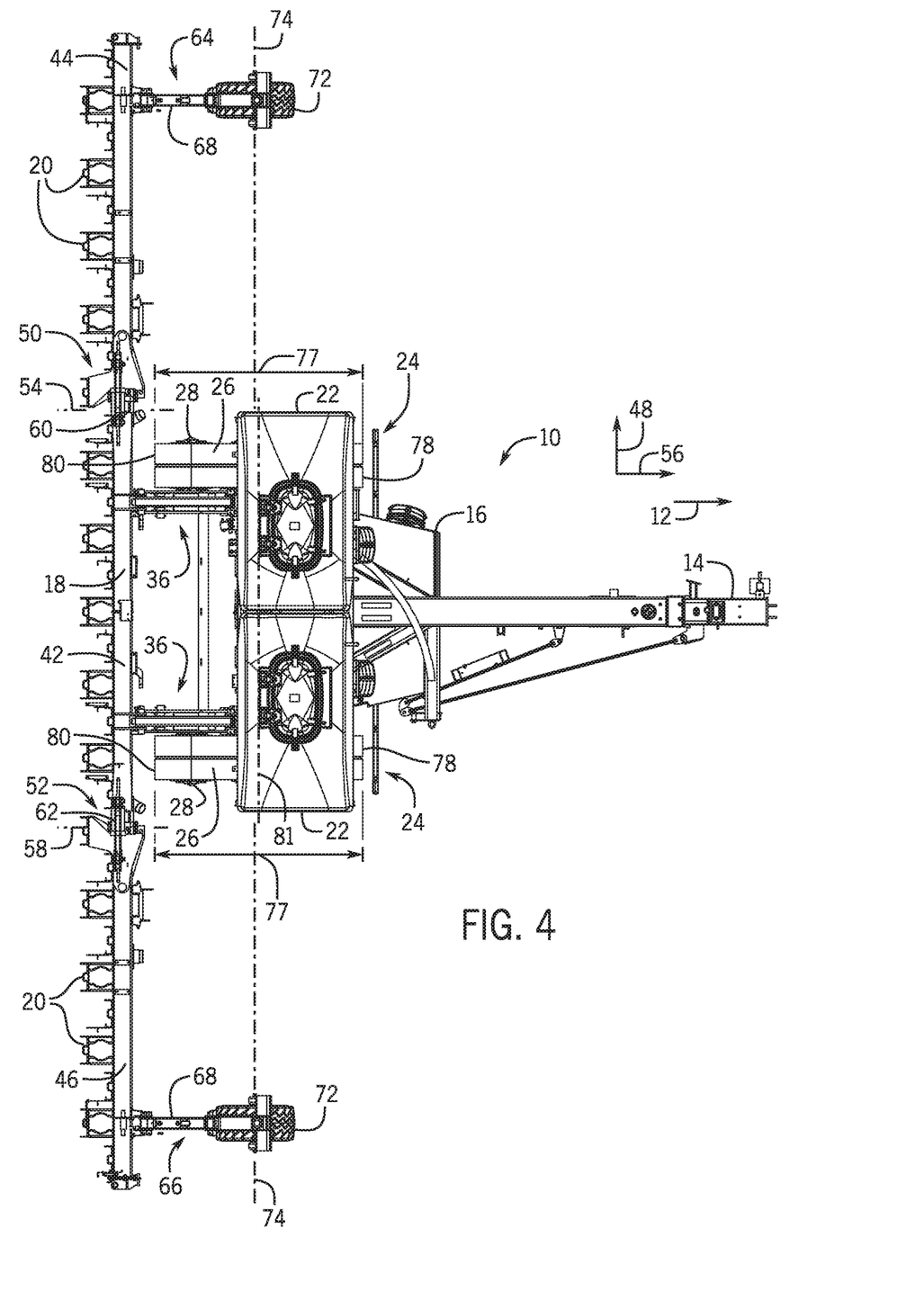
FIG. 4 is a top view of the agricultural implement of FIG. 1, in which the toolbar is in the working position.

FIG. 4 is a top view of the agricultural implement 10 of FIG. 1, in which the toolbar 18 is in the working position. As the caster wheels 72 move upwardly (e.g., as the toolbar 18 moves from the raised position, as shown in FIGS. 1 and 2, to the illustrated working position), the caster wheels 72 move forwardly along the longitudinal axis 56 relative to the direction of travel 12 (e.g., due to the configuration of each linkage assembly 68). With the toolbar 18 in the illustrated working position, the rotational axis 74 of each caster wheel 72 (e.g., while the caster wheel 72 is aligned with the longitudinal axis 56, as illustrated) is positioned proximate to the longitudinal center point 81 of each respective track assembly 24 along the longitudinal axis 56. As used herein, "proximate" refers to a distance between the rotational axis of the caster wheel and the longitudinal center point of the track assembly along the longitudinal axis of less than about 25 cm, less than about 20 cm, less than about 15 cm, less than about 10 cm, less than about 5 cm, or less than about 1 cm. Because the rotational axis 74 of each caster wheel 72 is positioned longitudinally proximate to the longitudinal center point 81 of each track assembly 24, the caster wheel 72, while aligned with the longitudinal axis 56, is oriented at or near a tangent to the swept path of the caster wheel as the agricultural implement turns. Therefore, the caster angle of each caster wheel during a turn may be reduced (e.g., as compared to a wheel positioned behind the track assemblies), which may reduce smearing of the soil surface within the path of the caster wheel (e.g., if the caster wheel experiences resistance to castering). As a result, the quality of the soil positioned under the caster wheels may be enhanced, thereby increasing the yield from seeds planted within the path of the caster wheels and/or reducing the intensity and/or frequency of tilling operations.

While the rotational axis 74 of each caster wheel 72 (e.g., while the caster wheel 72 is aligned with the longitudinal axis 56, as illustrated) is positioned proximate to the longitudinal center point 81 of the track assemblies 24 (e.g., proximate to the longitudinal center point 81 of a respective track assembly 24) along the longitudinal axis 56 in the illustrated embodiment, in other embodiments, the rotational axis of at least one caster wheel may be positioned forward or rearward of the longitudinal center point of the track assemblies/respective track assembly along the longitudinal axis while the toolbar is in the working position. For example, in certain embodiments, the rotational axis of at least one caster wheel may be positioned forward or rearward of the longitudinal extent of the track assemblies/respective track assembly while the toolbar is in the working position. While each caster wheel is positioned forward of the toolbar 18 relative to the direction of travel 12 in the illustrated embodiment, in other embodiments, at least one caster wheel may be positioned rearward of the toolbar relative to the direction of travel, and/or at least one caster wheel may be positioned substantially even with the toolbar along the longitudinal axis (e.g., below the toolbar, laterally outward from the toolbar, etc.) while the toolbar is in the working position.

Figure 5:
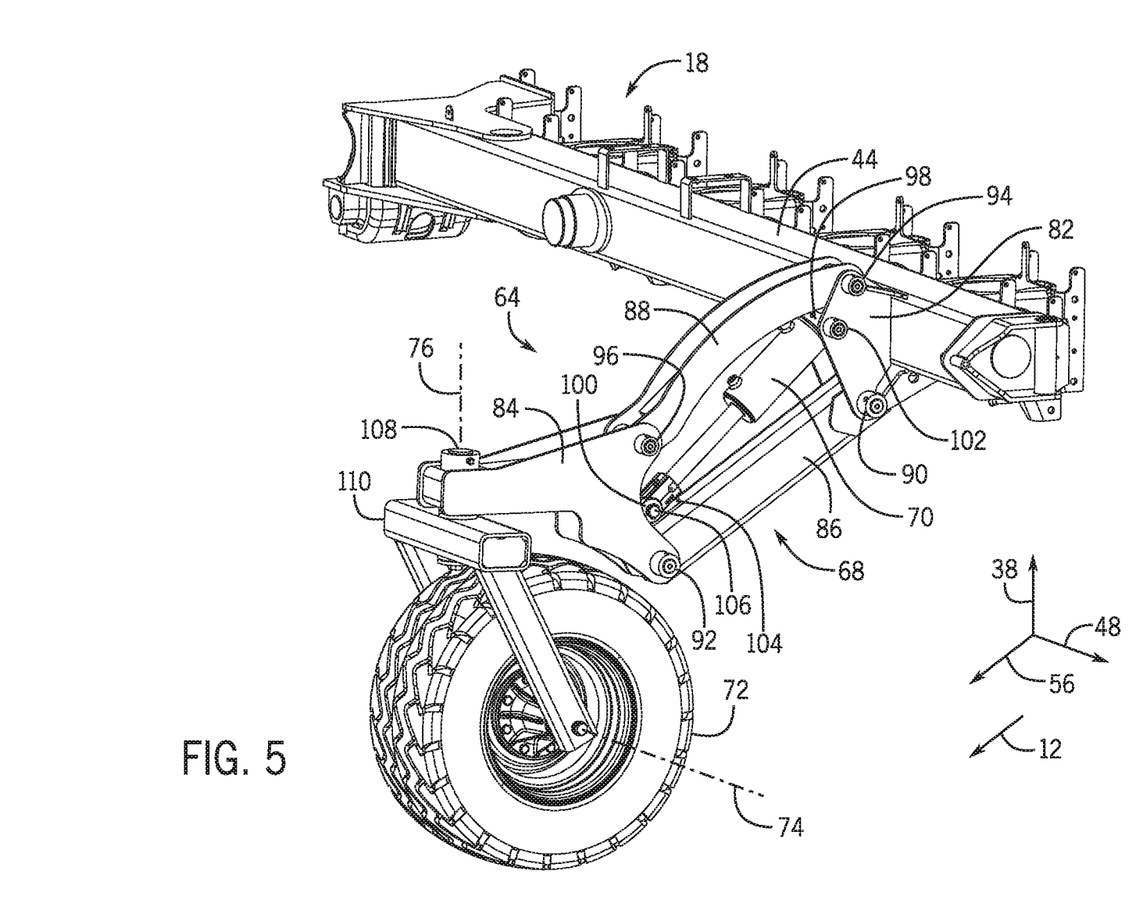
FIG. 5 is a perspective view of a caster wheel assembly of the agricultural implement of FIG. 1.

FIG. 5 is a perspective view of the first caster wheel assembly 64 of the agricultural implement of FIG. 1. While the components and functions of the first caster wheel assembly 64 are discussed below, it should be appreciated that in certain embodiments the second caster wheel assembly and/or any other caster wheel assembly/assemblies of the agricultural implement may have the same components and/or functions. Furthermore, while the illustrated caster wheel assembly is positioned forward of the toolbar relative to the direction of travel, in alternative embodiments, the caster wheel assembly may be positioned rearward of the toolbar relative to the direction of travel. In such embodiments, the longitudinal positions/directions disclosed below may be reversed accordingly.

As previously discussed, the caster wheel assembly 64 includes the linkage assembly 68, the actuator 70, and the caster wheel 72. In the illustrated embodiment, the linkage assembly 68 includes a toolbar link 82, a caster wheel link 84, a bottom link 86, and a top link 88. The toolbar link 82 is non-rotatably (e.g., fixedly) coupled to the left wing section 44 of the toolbar 18 (e.g., by a welded connection, by fasteners, etc.). In addition, the bottom link 86 is pivotally coupled to the toolbar link 82 at a first pivot joint 90, and the bottom link 86 is pivotally coupled to the caster wheel link 84 at a second pivot joint 92. Furthermore, the top link 88 is pivotally coupled to the toolbar link 82 at a third pivot joint 94, and the top link 88 is pivotally coupled to the caster wheel link 84 at a fourth pivot joint 96. Accordingly, the toolbar link 82, the caster wheel link 84, the bottom link 86, and the top link 88 form a four-bar linkage configured to facilitate movement of the caster wheel 72 substantially along the vertical axis 38.

As previously discussed, the actuator 70 is configured to control the position of the caster wheel 72 along the vertical axis 38 relative to the left wing section 44 of the toolbar 18. In the illustrated embodiment, the actuator is a hydraulic cylinder. However, in other embodiments, the actuator may be any other suitable type of actuator, such as a pneumatic cylinder or an electric linear actuator, among other suitable types of actuators. As illustrated, the actuator 70 has a first end 98 and a second end 100. The first end 98 of the actuator 70 is pivotally coupled to the toolbar link 82 at a fifth pivot joint 102. In the illustrated embodiment, the first end 98 of the actuator 70/fifth pivot joint 102 is positioned forward of the first and third pivot joints along the longitudinal axis 56 relative to the direction of travel 12. Accordingly, the actuator may be shorter and less expensive than an actuator having a first end mounted to a pivot joint positioned rearward of the first and/or third pivot joints relative to the direction of travel. The second end 100 of the actuator 70 is pivotally coupled to a mount 104 at a sixth pivot joint 106. As illustrated, the mount 104 is non-rotatably (e.g., fixedly) coupled to the bottom link 86. Accordingly, the second end 100 of the actuator 70 is positioned between the bottom link 86 and the top link 88 (e.g., along the vertical axis 38). Positioning the second end 100 of the actuator 70 between the bottom link 86 and the top link 88 enables the actuator to be positioned within the linkage assembly 68, thereby simplifying the manufacturing process and/or reducing the complexity of the actuator mounts (e.g., as compared to an actuator having a first end mounted to the toolbar and a second end mounted above the top link or below the bottom link).

Because the toolbar link 82 is non-rotatably (e.g., fixedly) coupled to the toolbar 18 and because the links are arranged as a four-bar linkage, the caster wheel 72 moves substantially along the vertical axis 38 as the caster wheel 72 moves between a first position relative to the toolbar 18 associated with the working position of the toolbar 18 and a second position relative to the toolbar 18 associated with the raised position of the toolbar 18. Accordingly, while the caster wheel 72 is aligned with the longitudinal axis 56, the rotational axis 74 of the caster wheel 72 remains within the longitudinal extent of the track assemblies while the toolbar 18 is in the working position and in the raised position. As such, while the caster wheel 72 is aligned with the longitudinal axis 56, the caster wheel 72 is oriented at or near a tangent to the swept path of the caster wheel as the agricultural implement turns. Therefore, the caster angle of the caster wheel during a turn may be reduced (e.g., as compared to a wheel positioned behind the track assemblies), which may reduce smearing of the soil surface within the path of the caster wheel (e.g., if the caster wheel experiences resistance to castering). As a result, the quality of the soil positioned under the caster wheel may be enhanced, thereby increasing the yield from seeds planted within the path of the caster wheel and/or reducing the intensity and/or frequency of tilling operations.

While the first end 98 of the actuator 70 is positioned forward of the first and third pivot joints relative to the direction of travel 12 in the illustrated embodiments, in other embodiments, the first end of the actuator may be positioned rearward of the first pivot joint and/or the third pivot joint relative to the direction of travel. Furthermore, while the first end 98 of the actuator 70 is pivotally coupled to the toolbar link 82 in the illustrated embodiment, in other embodiments, the first end of the actuator may be pivotally coupled to the toolbar or to a mount coupled to the toolbar. In addition, while the second end 100 of the actuator 70 is pivotally coupled to the bottom link 86 via the mount 104 in the illustrated embodiment, in other embodiments, the second end of the actuator may be pivotally coupled to the top link (e.g., via a mount), or the second end of the actuator may be pivotally coupled to the caster wheel link 84 (e.g., in embodiments in which the first end of the actuator is pivotally coupled to the toolbar or to a mount coupled to the toolbar). While the caster wheel 72 of the first caster wheel assembly 64 is movably coupled to the left wing section 44 of the toolbar 18 by the illustrated four-bar linkage assembly, in other embodiments, the caster wheel may be movably coupled to the toolbar by another suitable type of linkage that facilitates movement of the caster wheel substantially along the vertical axis 38.

The caster wheel 72 is configured to caster relative to the caster wheel link 84 while the toolbar 18 is in the working position and in the raised position. In the illustrated embodiment, the caster wheel 72 is pivotally coupled to the caster wheel link 84 by a seventh pivot joint 108. The seventh pivot joint 108 is positioned forward of the second and fourth pivot joints along the longitudinal axis 56 relative to the direction of travel 12. As a result, the caster wheel 72 may be positioned farther forward relative to the track assemblies (e.g., as compared to a caster wheel pivotally coupled to the caster wheel link behind the second and/or fourth pivot joints). As a result, while the caster wheel 72 is aligned with the longitudinal axis 56, the caster wheel may be oriented at or near a tangent to the swept path of the caster wheel as the agricultural implement turns, which may reduce the caster angle during a turn.

In the illustrated embodiment, the caster wheel 72 is supported by a two-armed fork assembly 110, which is pivotally coupled to the caster wheel link 84 by the seventh pivot joint. However, in alternative embodiments, the caster wheel may be supported by any other suitable assembly/structure configured to pivotally couple the caster wheel to the caster wheel link. Furthermore, in the illustrated embodiment, the rotational axis 76 of the caster wheel 72 is substantially parallel to the vertical axis 38. However, in alternative embodiments, the rotational axis of the caster wheel may be angled relative to the vertical axis. While the seventh pivot joint 108 is positioned forward of the second and fourth pivot joints relative to the direction of travel 12 in the illustrated embodiment, in other embodiments, the seventh pivot joint may be positioned rearward of the second pivot joint and/or the fourth pivot joint. In the illustrated embodiment, the first caster wheel assembly 64 does not include a locking mechanism configured to block castering of the caster wheel 72 (e.g., while the toolbar 18 is in the working position, etc.). However, in certain embodiments, the caster wheel assembly may include a locking mechanism configured to block castering of the caster wheel while the toolbar is in the transport position.

As used herein, "substantially" refers to an angle between paths/axes of less than 15 degrees, less than 12 degrees, less than 10 degrees, less than 8 degrees, less than 5 degrees, less than 2 degrees, or less than 1 degree. For example, an angle between the longitudinal axis and the rotational axes of the wing sections may be less than 15 degrees, less than 12 degrees, less than 10 degrees, less than 8 degrees, less than 5 degrees, less than 2 degrees, or less than 1 degree. Furthermore, an angle between the vertical axis and the path of each caster wheel (e.g., line connecting the position of the caster wheel while the toolbar is in the raised position and the position of the caster wheel while the toolbar is in the working position) may be less than 15 degrees, less than 12 degrees, less than 10 degrees, less than 8 degrees, less than 5 degrees, less than 2 degrees, or less than 1 degree. In addition, an angle between the vertical axis and the castering axis of each caster wheel may be less than 15 degrees, less than 12 degrees, less than 10 degrees, less than 8 degrees, less than 5 degrees, less than 2 degrees, or less than 1 degree. Also, an angle between the vertical axis and the path of the toolbar (e.g., line connecting the position of the toolbar in the raised position and the position of the toolbar in the working position) may be less than 15 degrees, less than 12 degrees, less than 10 degrees, less than 8 degrees, less than 5 degrees, less than 2 degrees, or less than 1 degree.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An agricultural implement, comprising:
a main frame assembly;
a hitch assembly non-rotatably coupled to the main frame assembly and configured to rotatably couple the agricultural implement to a work vehicle;
a track assembly coupled to the main frame assembly and configured to support the main frame assembly;
a toolbar coupled to the main frame assembly, wherein the toolbar comprises a center section, a first wing section, and a second wing section, the first wing section is configured to rotate relative to the center section, the second wing section is configured to rotate relative to the center section, and the toolbar is configured to support a plurality of row units; and
a caster wheel assembly coupled to one wing section of the first and second wing sections, wherein the caster wheel assembly comprises a linkage assembly, an actuator, and a caster wheel;
wherein the linkage assembly comprises a toolbar link, a caster wheel link, a bottom link, and a top link, the toolbar link is non-rotatably coupled to the one wing section, the bottom link is pivotally coupled to the toolbar link at a first pivot joint, the bottom link is pivotally coupled to the caster wheel link at a second pivot joint, the top link is pivotally coupled to the toolbar link at a third pivot joint, and the top link is pivotally coupled to the caster wheel link at a fourth pivot joint;

wherein the actuator is configured to control a vertical position of the caster wheel relative to the one wing section, the actuator has a first end and a second end, and the second end is positioned between the bottom link and the top link;

wherein the linkage assembly comprises a mount non-rotatably coupled to the bottom link or the top link, and the second end of the actuator is pivotally coupled to the mount; and wherein the caster wheel is pivotally coupled to the caster wheel link to enable the caster wheel to caster relative to the caster wheel link while the toolbar is in a working position and in a raised position.

2. The agricultural implement of claim 1, wherein the caster wheel assembly is positioned forward of the toolbar relative to a direction of travel of the agricultural implement.

3. The agricultural implement of claim 1, wherein a rotational axis of the caster wheel is positioned proximate to a longitudinal center point of the track assembly along a longitudinal axis of the agricultural implement at least while the toolbar is in the working position.

4. The agricultural implement of claim 1, wherein the first end of the actuator is pivotally coupled to the toolbar link.

5. The agricultural implement of claim 4, wherein the first end of the actuator is positioned forward of the first and third pivot joints relative to a direction of travel of the agricultural implement.

6. The agricultural implement of claim 1, wherein the caster wheel is pivotally coupled to the caster wheel link by a fifth pivot joint, and the fifth pivot joint is positioned forward of the second and fourth pivot joints relative to a direction of travel of the agricultural implement.

7. An agricultural implement, comprising:
a main frame assembly;
a hitch assembly non-rotatably coupled to the main frame assembly and configured to rotatably couple the agricultural implement to a work vehicle;
a track assembly coupled to the main frame assembly and configured to support the main frame assembly;
a toolbar coupled to the main frame assembly, wherein the toolbar is vertically movable relative to the main frame assembly between a working position and a raised position, and the toolbar is configured to support a plurality of row units; and
a caster wheel assembly coupled to the toolbar, wherein the caster wheel assembly comprises a linkage assembly, an actuator, and a caster wheel;
wherein the linkage assembly comprises a toolbar link, a caster wheel link, a bottom link, and a top link, the toolbar link is non-rotatably coupled to the toolbar, the bottom link is pivotally coupled to the toolbar link at a first pivot joint, the bottom link is pivotally coupled to the caster wheel link at a second pivot joint, the top link is pivotally coupled to the toolbar link at a third pivot joint, and the top link is pivotally coupled to the caster wheel link at a fourth pivot joint;
wherein the actuator is configured to control a vertical position of the caster wheel relative to the toolbar, the actuator has a first end and a second end, and the second end is positioned between the bottom link and the top link;
wherein a rotational axis of the caster wheel is positioned proximate to a longitudinal center point of the track assembly along a longitudinal axis of the agricultural implement at least while the toolbar is in the working position; and wherein the caster wheel is pivotally coupled to the caster wheel link to enable the caster wheel to caster relative to the caster wheel link while the toolbar is in the working position and in the raised position.

8. The agricultural implement of claim 7, wherein the linkage assembly comprises a mount non-rotatably coupled to the bottom link, and the second end of the actuator is pivotally coupled to the mount.

9. The agricultural implement of claim 7, wherein the caster wheel assembly is positioned forward of the toolbar relative to a direction of travel of the agricultural implement.

10. The agricultural implement of claim 7, wherein the first end of the actuator is pivotally coupled to the toolbar link.

11. The agricultural implement of claim 10, wherein the first end of the actuator is positioned forward of the first and third pivot joints relative to a direction of travel of the agricultural implement.

12. The agricultural implement of claim 7, comprising a second linkage assembly and a second actuator, wherein the second linkage assembly movable couples the toolbar to the main frame assembly, and the second actuator is configured to drive the toolbar to move between the working position and the raised position.

13. An agricultural implement, comprising:
a main frame assembly;
a hitch assembly non-rotatably coupled to the main frame assembly and configured to rotatably couple the agricultural implement to a work vehicle;
a track assembly coupled to the main frame assembly and configured to support the main frame assembly;
a toolbar coupled to the main frame assembly, wherein the toolbar is configured to support a plurality of row units; and
a caster wheel assembly coupled to the toolbar, wherein the caster wheel assembly comprises a linkage assembly, an actuator, and a caster wheel;
wherein the caster wheel assembly is positioned forward of the toolbar relative to a direction of travel of the agricultural implement such that a rotational axis of the caster wheel is positioned within a longitudinal extent of the track assembly at least while the toolbar is in a working position and in a raised position;
wherein the linkage assembly comprises a toolbar link, a caster wheel link, a bottom link, and a top link, the toolbar link is non-rotatably coupled to the toolbar, the bottom link is pivotally coupled to the toolbar link at a first pivot joint, the bottom link is pivotally coupled to the caster wheel link at a second pivot joint, the top link is pivotally coupled to the toolbar link at a third pivot joint, and the top link is pivotally coupled to the caster wheel link at a fourth pivot joint;
wherein the actuator is configured to control a vertical position of the caster wheel relative to the toolbar, the actuator has a first end and a second end, and the second end is positioned between the bottom link and the top link;
wherein the first end of the actuator is pivotally coupled to the toolbar link, and the first end of the actuator is positioned forward of the first and third pivot joints relative to the direction of travel of the agricultural implement; and
wherein the caster wheel is pivotally coupled to the caster wheel link to enable the caster wheel to caster relative to the caster wheel link while the toolbar is in the working position and in the raised position.

14. The agricultural implement of claim 13, wherein the linkage assembly comprises a mount non-rotatably coupled to the bottom link, and the second end of the actuator is pivotally coupled to the mount.

15. The agricultural implement of claim 13, wherein the rotational axis of the caster wheel is positioned proximate to a longitudinal center point of the track assembly along a longitudinal axis of the agricultural implement at least while the toolbar is in the working position.

16. The agricultural implement of claim 13, wherein the caster wheel is pivotally coupled to the caster wheel link by a fifth pivot joint, and the fifth pivot joint is positioned forward of the second and fourth pivot joints relative to the direction of travel of the agricultural implement.

* * * * *